US010721295B2

(12) United States Patent
Enguehard et al.

(10) Patent No.: US 10,721,295 B2
(45) Date of Patent: Jul. 21, 2020

(54) POPULARITY-BASED LOAD-BALANCING FOR FOG-CLOUD PLACEMENT

(71) Applicant: Cisco Technology, Inc., San Jose, CA (US)

(72) Inventors: Marcel Paul Enguehard, Paris (FR); Giovanna Carofiglio, Paris (FR); Dario Giacomo Rossi, Paris (FR)

(73) Assignee: Cisco Technology, Inc., San Jose, CA (US)

( * ) Notice: Subject to any disclaimer, the term of this patent is extended or adjusted under 35 U.S.C. 154(b) by 66 days.

(21) Appl. No.: 16/043,550

(22) Filed: Jul. 24, 2018

(65) Prior Publication Data

US 2020/0036779 A1  Jan. 30, 2020

(51) Int. Cl.
*H04L 29/08* (2006.01)
*G06F 9/50* (2006.01)

(52) U.S. Cl.
CPC .......... *H04L 67/1014* (2013.01); *G06F 9/505* (2013.01); *H04L 67/101* (2013.01); *H04L 67/1008* (2013.01); *H04L 67/1029* (2013.01); *H04L 67/1031* (2013.01); *H04L 67/327* (2013.01)

(58) Field of Classification Search
CPC ............... H04L 67/1014; H04L 67/101; H04L 67/1031; H04L 67/1008; H04L 67/327; H04L 67/1029; G06F 9/505
See application file for complete search history.

(56) References Cited

U.S. PATENT DOCUMENTS 6,745,243 B2   6/2004  Squire et al.
10,320,680 B1 *  6/2019  Mehr .................... H04L 47/283
(Continued)

FOREIGN PATENT DOCUMENTS

CN          108156267 A  *  6/2018  ............ H04L 29/08
WO      WO-2014098790 A1    6/2014

OTHER PUBLICATIONS

Yuan et al. CN 108156267 A, "Reducing website access time delay by using caches in fog computing architecture", Jun. 12, 2018, Machine translation, 4 pages. (Year: 2018).*
(Continued)

*Primary Examiner* — Arvin Eskandarnia
*Assistant Examiner* — Chhian (Amy) Ling
(74) *Attorney, Agent, or Firm* — Behmke Innovation Group LLC; James M. Behmke; Jonathon P. Western

(57) ABSTRACT

In one embodiment, a load-balancer in a computer network receives an end-device request for a particular network-based resource, and determines a popularity of the particular network-based resource being requested in comparison to other network-based resources requested by end devices in the computer network. In response to the particular network-based resource being popularly requested, the load-balancer forwards the end-device request into a Fog network to cause the Fog network to respond to the end-device request with particular network-based resource. Conversely, in response to the particular network-based resource not being popularly requested, the load-balancer forwards the end-device request into a Cloud network to cause the Cloud network to respond to the end-device request with particular network-based resource.

20 Claims, 7 Drawing Sheets

(56) References Cited

U.S. PATENT DOCUMENTS

| | | | |
|---|---|---|---|
| 2010/0106914 A1* | 4/2010 | Krishnaprasad | G06F 12/0815 |
| | | | 711/143 |
| 2015/0124825 A1* | 5/2015 | Dharmapurikar | H04L 45/7453 |
| | | | 370/392 |
| 2017/0041235 A1 | 2/2017 | Pan | |
| 2017/0180252 A1* | 6/2017 | Mosko | H04L 61/3005 |
| 2018/0145927 A1* | 5/2018 | Srikanteswara | H04L 43/16 |
| 2018/0349292 A1* | 12/2018 | Tal | G06F 12/123 |

OTHER PUBLICATIONS

Bonomi, et al., "Fog Computing and Its Role in the Internet of Things", MCC'12, Aug. 17, 2012, Helsinki, Finland., 3 pages, 2012, ACM.

Brent, R. P., "Algorithms for Minimization Without Derivatives", Englewood Cliffs, NJ, 1973. Ch. 3-4, Prentice-Hall.

Breslau, et al., Web Caching and Zipf-like Distributions: Evidence and Implications, INFOCOM'99. Eighteenth Annual Joint Conference of the IEEE Computer and Communications Societies, vol. 1. 1999, pp. 126-134, IEEE.

Cardwell, et al., "BBR: Congestion-Based Congestion Control, ACM Queue", vol. 14, Issue 5, Dec. 1, 2016, ACM, Inc.

Carofiglio, et al., "FOCAL: Forwarding and Caching with Latency Awareness in Information-Centric Networking", 2015 IEEE Globecom Workshops (GC Wkshps), 2015, IEEE.

Jacobson, et al., "Networking Named Content", In Proceedings of the 5th international conference on Emerging networking experiments and technologies (CoNEXT '09), 2008, 8 pages, ACM.

Janaszka, et al., "On Popularity-Based Load Balancing in Content Networks", Proceedings of the 2012 24th International Teletraffic Congress (ITC 24), 8 pages, 2012, International Teletraffic Congress.

Malawski, et al., "Cost Minimization for Computational Applications on Hybrid Cloud Infrastructures", Future Generation Computer Systems, vol. 29 Issue 7, Sep. 2013, pp. 1786-1794, Elsevier Science Publishers B. V.

Niu, et al., "Handling flash deals with soft guarantee in hybrid cloud", IEEE INFOCOM 2017—IEEE Conference on Computer Communications, Atlanta, GA, 2017, pp. 1-9, IEEE.

Soltani, et al., "A Dynamic Popularity-Aware Load Balancing Algorithm for Structured P2P Systems", 9th International Conference on Network and Parallel Computing (NPC), Lecture Notes in Computer Science, LNCS-7513, pp. 77-84, 2012, Springer.

Zhang, et al., "Named data networking", ACM SIGCOMM Computer Communication Review, vol. 44 Issue 3, Jul. 2014, pp. 66-73, ACM.

* cited by examiner

POPULARITY-BASED LOAD-BALANCING FOR FOG-CLOUD PLACEMENT

TECHNICAL FIELD

The present disclosure relates generally to computer networks, and, more particularly, to popularity-based load-balancing for Fog-Cloud placement.

BACKGROUND

Fog computing is a complementary solution to the traditional cloud-computing approach. Fog nodes are machines running directly on an edge network that have storage and compute power and can run applications, implement caches, or preprocess data. However, as the nodes have to be deployed on the edge, fog computing (in "the Fog") is not as elastic as current cloud platforms ("the Cloud"). For instance, applications may be running on a fog platform, with a fixed compute and memory capacity, where the fog node acts as both a cache and a compute platform. In case of a sudden burst of requests to the applications (e.g., a flash crowd), storage and compute space can be rented in the Cloud to offload some of the processing. In such a situation, however, current systems are generally inefficient in determining which requests should be computed in the Fog, and which should be forwarded to the Cloud.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
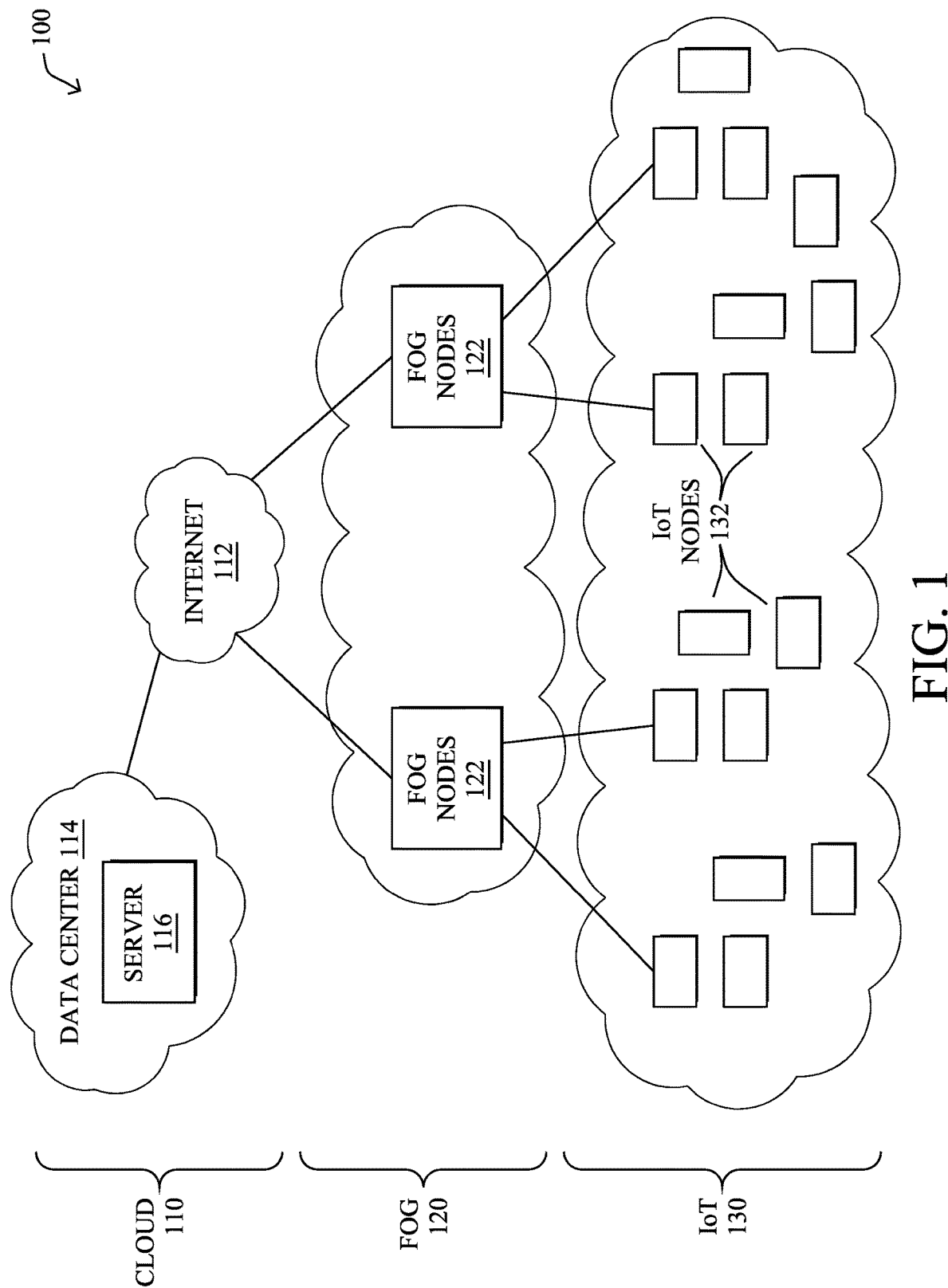
FIG. 1 illustrates an example communication network.

According to one or more embodiments of the disclosure, a load-balancer in a computer network receives an end-device request for a particular network-based resource, and determines a popularity of the particular network-based resource being requested in comparison to other network-based resources requested by end devices in the computer network. In response to the particular network-based resource being popularly requested, the load-balancer forwards the end-device request into a Fog network to cause the Fog network to respond to the end-device request with particular network-based resource. Conversely, in response to the particular network-based resource not being popularly requested, the load-balancer forwards the end-device request into a Cloud network to cause the Cloud network to respond to the end-device request with particular network-based resource.

Notably, in one embodiment, the load-balancer computes count-based popularity of network-based resources, while in another embodiment, a least-recently-used (LRU) filter is maintained such that popularly requested network-based resources are those remaining within the LRU filter. Also, in one embodiment, the load-balancer ensures that the Fog network is not overloaded with requests, else forwarding received requests into the Cloud regardless of popularity.

Description

A computer network is a geographically distributed collection of nodes interconnected by communication links and segments for transporting data between end nodes, such as personal computers and workstations, or other devices, such as sensors, actuators, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), long distance wireless links, and others. Other types of networks, such as field area networks (FANs), neighborhood area networks (NANs), personal area networks (PANs), etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT provides the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network. Often, IoT networks operate within a shared-media mesh networks, such as wireless or PLC networks, etc. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks or user networks) to the Cloud (e.g., centralized and/or shared resources, as will be understood by those skilled in the art). That is, generally, fog computing entails using layers of devices at or near the network edge to provide application services to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, energy reserves, load factors, location, etc.

Specifically, as shown in the example network 100, three illustrative layers are shown, namely the cloud network 110 (the Cloud), fog network 120 (the Fog), and IoT network 130 (with IoT nodes ("things" or "endpoints") 132). Illustratively, the Cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other. Resources in fog nodes 122 and the links surrounding them may be shared between different users, applications, organizations, or tenants in IoT network 130.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure. For example "real-world" computer networks may comprise any type of network, including, among others, Fog networks, IoT networks, cloud networks, core networks, backbone networks, data centers, enterprise networks, provider networks, customer networks, virtualized networks (e.g., virtual private networks or "VPNs"), combinations thereof, and so on. Also note that while one layer of fog nodes 122 is shown, the fog layer 120 can comprise a hierarchy of fog layers. Note further that the network environments and their associated devices may also be located in different geographic locations.

Figure 2:
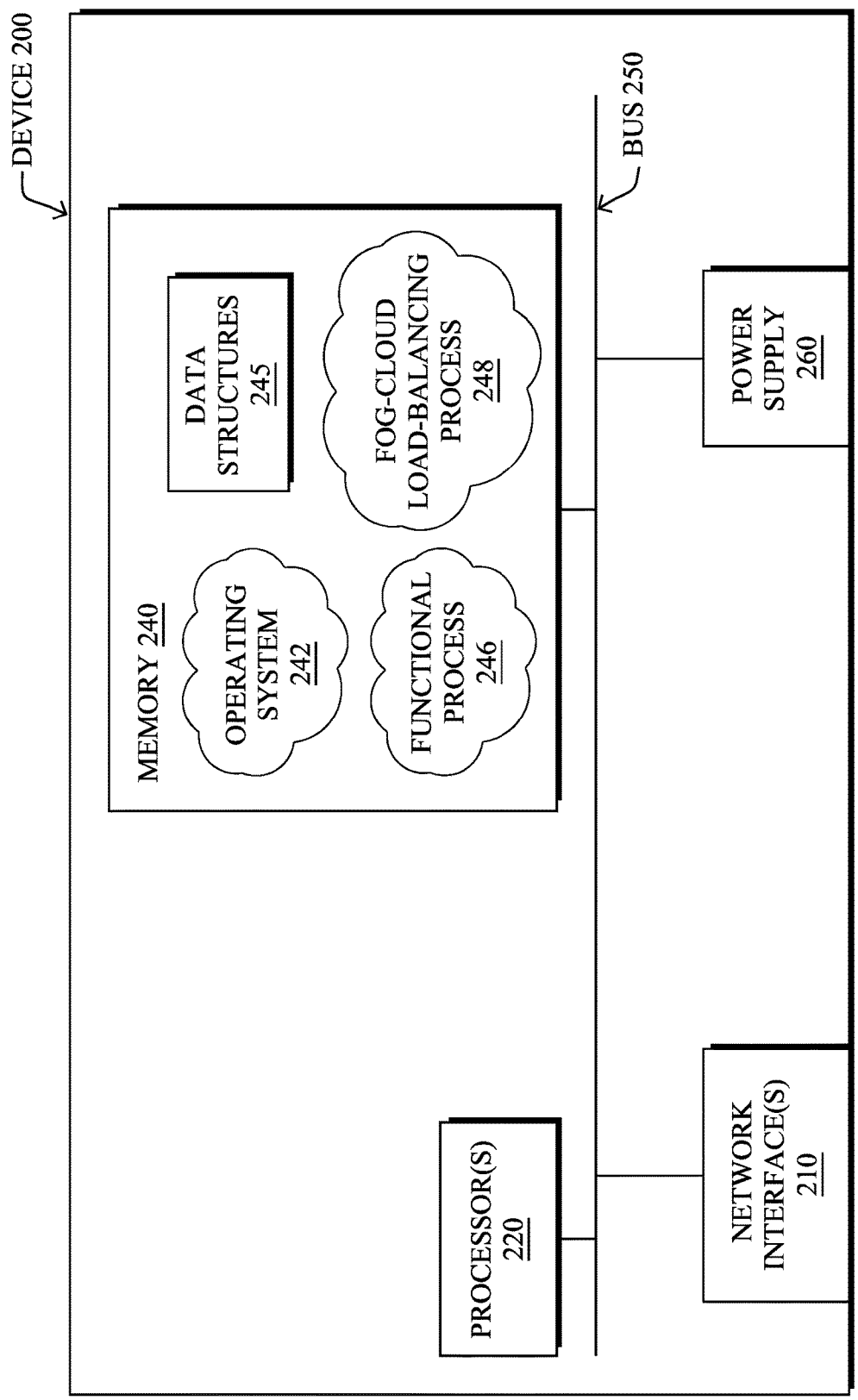
FIG. 2 illustrates an example network device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, WiFi transceivers, cellular transceivers, or the like, each to allow device 200 to communicate information to and from a remote computing device or server over an appropriate network. The same network interfaces 210 also allow communities of multiple devices 200 to interconnect among themselves, either peer-to-peer, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "fog-cloud load-balancing" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

—Popularity-Based Load-Balancing for Fog-Cloud Placement—

The techniques herein generally address the creation of an intelligent (dynamic and application-specific) load-balancing platform for IoT data processing in Fog/Edge versus Cloud networks, particularly with the twofold objective of fulfilling latency requirements, while minimizing cost (defined as a combination of transport, caching, and compute, which may depend on particular implementations).

For example, assume a named-based networking approach in the context of a wireless access network (e.g., LTE or 5G), where actuators and human-controlled endpoints (e.g., smartphones) are accessing various applications (e.g., smart-city) which use the data gathered from sensors. Some of these applications (e.g., augmented reality or virtual reality (AR/VR), vehicle automation, and so on) may have very strong latency constraints, which are difficult if not impossible to satisfy if the compute is performed in the Cloud.

As noted above, Fog computing is a complementary solution to the traditional Cloud-computing approach. Fog nodes are machines running directly on the edge network that have storage and compute power and can run applications, implement caches, or preprocess data. However, as the nodes have to be deployed on the edge, Fog computing is not as elastic as current Cloud platforms. For instance, imagine the case where an application is running on a Fog platform with a fixed compute and memory capacity, where Fog nodes act as both a cache and a compute platform. In case of a sudden burst of requests to the applications (e.g., a flash crowd), storage and compute space can be rented in the Cloud to offload some of the processing.

Figure 3:
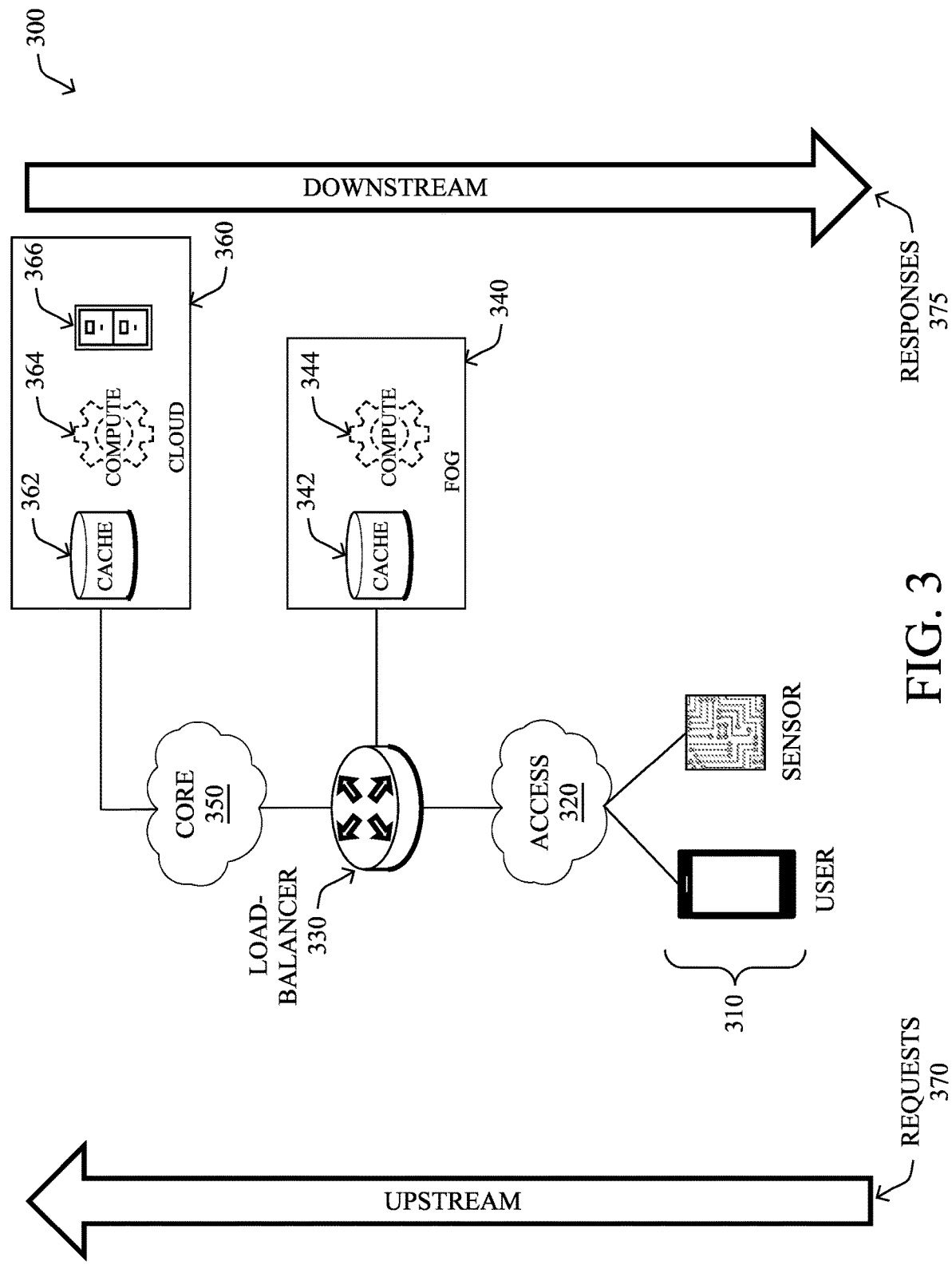
FIG. 3 illustrates an example of a simplified computer network configured for load balancing requests between the Fog and the Cloud.

FIG. 3 illustrates an alternative view of a computer network 300, where devices 310 (e.g., user devices, sensors, actuators, etc.) are connected to the network 300 via an access network 320 (e.g., wireless access points, cellular towers, etc.). A load-balancer 330, such as a router, switch, or other computer networking device, may then decide whether to forward requests to the Fog 340 (with cache resources 342 and compute resources 344), or through the core network 350 and into the Cloud 360 (with cache resources 362, compute resources 364, and other database/storage resources 366). For reference, communication (e.g., "requests" 370) from the devices 310 into the network is considered "upstream" traffic, while communication in the reverse (toward the devices, e.g., "responses" 375) is considered "downstream" traffic.

As further mentioned above, current techniques are inefficient at deciding which requests should be computed in the Fog, and which should be forwarded to the Cloud. The techniques herein, therefore, load balance between the Fog and Cloud in a manner that minimizes the cost of the network, compute, and storage resources used in the Cloud, while still probabilistically respecting latency constraints or other constraints. In particular, the techniques herein optimize the cost of offloading requests in the Cloud from a Fog resource with a popularity-aware load-balancing algorithm, where the most popular content can be probabilistically detected and forwarded to the Fog so as to optimize the cache hit rate within the Fog. Accordingly, the techniques herein greatly increase the number of requests that can be handled in the Fog, making the setup less costly in terms of Cloud provisioning and more resistant to sudden bursts of requests.

Specifically, according to one or more embodiments of the disclosure as described in detail below, a load-balancer in a computer network receives an end-device request for a particular network-based resource, and determines a popularity of the particular network-based resource being requested in comparison to other network-based resources requested by end devices in the computer network. (Notably, in one embodiment, the load-balancer computes count-based popularity of network-based resources, while in another embodiment, a least-recently-used (LRU) filter is maintained such that popularly requested network-based resources are those remaining within the LRU filter.) In response to the particular network-based resource being popularly requested, the load-balancer forwards the end-device request into a Fog network to cause the Fog network to respond to the end-device request with particular network-based resource. (Unless, as described below, the Fog network is overloaded, e.g., reaches a defined latency limit.) Conversely, in response to the particular network-based resource not being popularly requested, the load-balancer forwards the end-device request into a Cloud network to cause the Cloud network to respond to the end-device request with particular network-based resource.

Illustratively, the techniques described herein may be performed by hardware, software, and/or firmware, such as in accordance with the fog-cloud load-balancing process 248, which may include computer executable instructions executed by the processor 220 (or independent processor of interfaces 210) to perform functions relating to the techniques described herein, e.g., on an individual device basis or else in conjunction with other devices (e.g., distributed popularity computations).

Operationally, the techniques herein are based generally on understanding request popularity. That is, the techniques herein optimize the cache hit probability in the Fog (i.e., the least expensive way of answering a request), by only forwarding the "most popular" requests to the Fog.

Figure 4A:
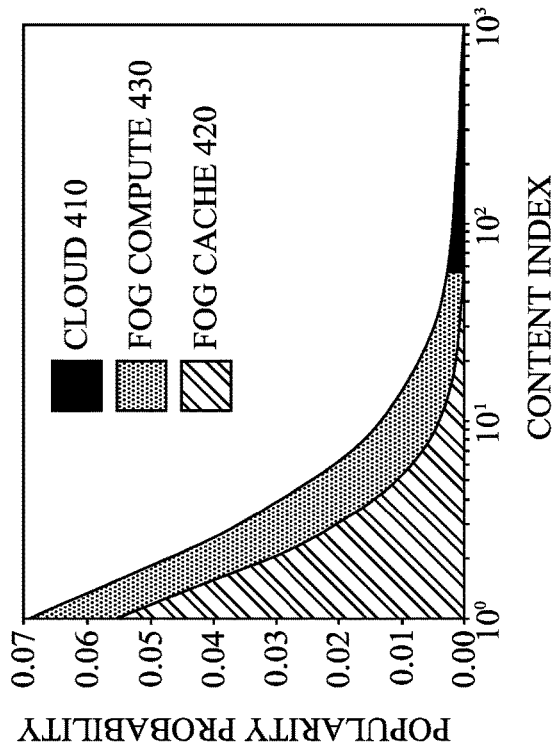
FIGS. 4A-4B illustrate an example benefit of popularity-based load-balancing for Fog-Cloud placement.
Figure 4B:
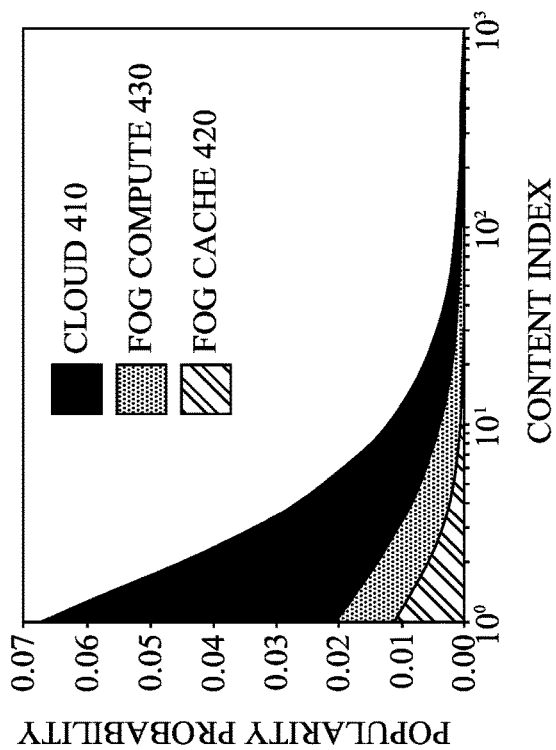

The effectiveness of such a strategy (referenced herein as "MP1" for "Most Popular First") is illustrated with reference to FIGS. 4A-4B. In both graphs 400a and 400b of FIGS. 4A-4B (respectively), popularity follows a Zipf distribution, and the graphs are broken down into the requests handled in the Cloud (410), requests handled by the Fog cache (420), and the requests handled by the Fog compute (430). In graph 400a of FIG. 4A, an incoming request is forwarded (load-balanced) with a probability p to the Fog regardless of its popularity (referred to herein as "Blind-LB"). In graph 400b of FIG. 4B, on the other hand, the MP1 strategy herein is applied.

In both cases (400a and 400b), the Fog compute area 430 is roughly the same, as the Fog compute 344 can generally handle a fixed amount of requests before being overloaded. However, with the MP1 strategy herein (400b), the hit rate in the Fog cache is much higher (area 420), thus making the number of requests handled in the Cloud (area 410) much lower.

In order for the techniques herein to classify and differentiate requests (requested network resources), the load-balancer must be able to retrieve some information about the requests. This can be done, for example, by either implementing the load-balancer in an application programming interface (API) gateway with access to the request information, or else by using an expressive network protocol such as Information Centric Networking (ICN) (e.g., where the requested content is learned from an ICN name in an interest packet).

Once the content of the requests is determined, their "popularity" may then be computed. Popularity, in general, refers to how often, how frequent, or how many requests for the same network-based resources (information, data, compute results, and so on), particularly as compared to other requested resources.

In the MP1 embodiment, counters may be kept for each request received, maintaining a list of "most popular" requests as those above some threshold (e.g., requests over 'n' count) or else a set of top requests (e.g., the top 'n' requests), among other techniques for maintaining popularity counts.

Notably, however, as learning the popularity of request is difficult and requires keeping counters for every possible request, the techniques herein further propose the use of a Least-Recently Used (LRU) filter within the load-balancer. For instance, this filter work by storing a sample (e.g., of fixed size) of the request population, updating itself each time a new request comes in according to the LRU policy. The LRU-based strategy is referred to herein as "MP1-LRU".

Figure 5:
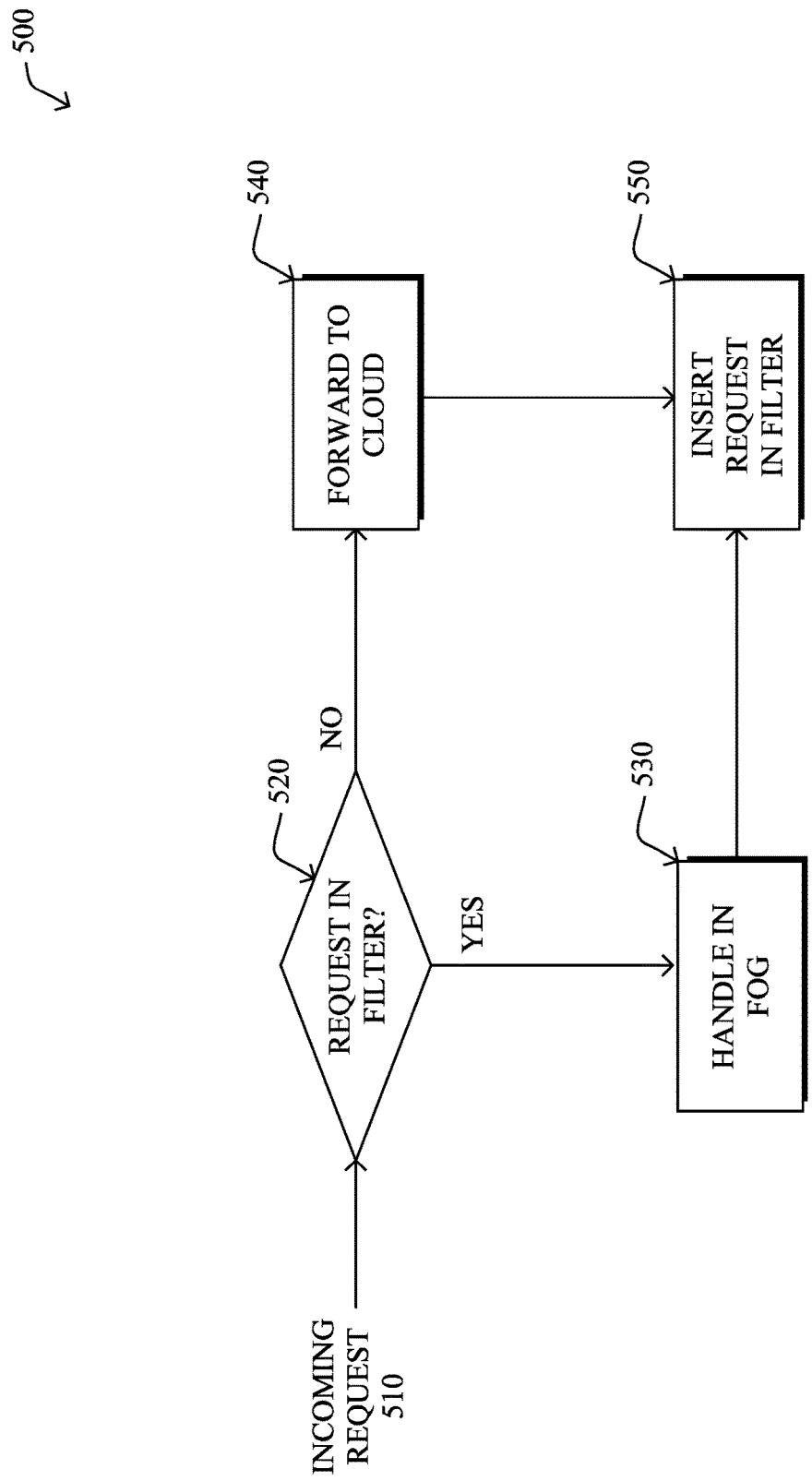
FIG. 5 illustrates an example of popularity-based load-balancing for Fog-Cloud placement using a least-recently-used (LRU) filter.

FIG. 5 illustrates a simplified example of MP1-LRU functioning (flow chart 500), where incoming requests 510 are received by the LRU filter 520. If the request is in the filter, then it has been recently received (thus can be deemed "popular"), and the request may be handled in the Fog in block 530. If the request is not in the filter, then the request may be forwarded to the Cloud in block 540. In either case, the request is inserted into the filter (block 550), such that a least-recently-received request may be removed from the filter (if the new request was not already in the filter), or else the newly received request is shifted within the filter to a more-recent position, accordingly. (Those skilled in the art will readily understand the operation of an LRU filter, generally.)

Notably, using an LRU filter instead of counting packets has several distinct advantages:
Lower computation and memory overhead;
LRU is a data structure used in current ICN implementations, and thus requires minimal implementation efforts; and
LRU is more flexible with regard to sudden popularity changes since it has no memory except for its ordering.

According to the techniques herein, the MP1-LRU strategy may also be extended as follows: forward only the (probabilistically) 'k' most popular requests to the Fog (and the rest to the Cloud), notably up until reaching a point at which the Fog network is overloaded with requests. In particular, in one specific embodiment, Fog network overloading may correspond to reaching some statistical latency limit, such as an average latency plus a standard deviation of the latency. (Note that statistical latency may be deduced by looking at the interest timestamps in a Pending Interest Table (PIT).) Alternatively, a penalty function to express violation of latency constraints and engaged costs can also be more generally defined and used herein.

The size of the LRU filter can be determined using a root-finding algorithm (such as the known "Brent's method") or a congestion control algorithm (such as the known "Bandwidth Bottleneck and Round-trip propagation time" or "BBR" algorithm). Also, preliminary results also show that using a fixed LRU size of twice the size of the Fog cache is a good approximation for high request arrival rates.

Figure 6:
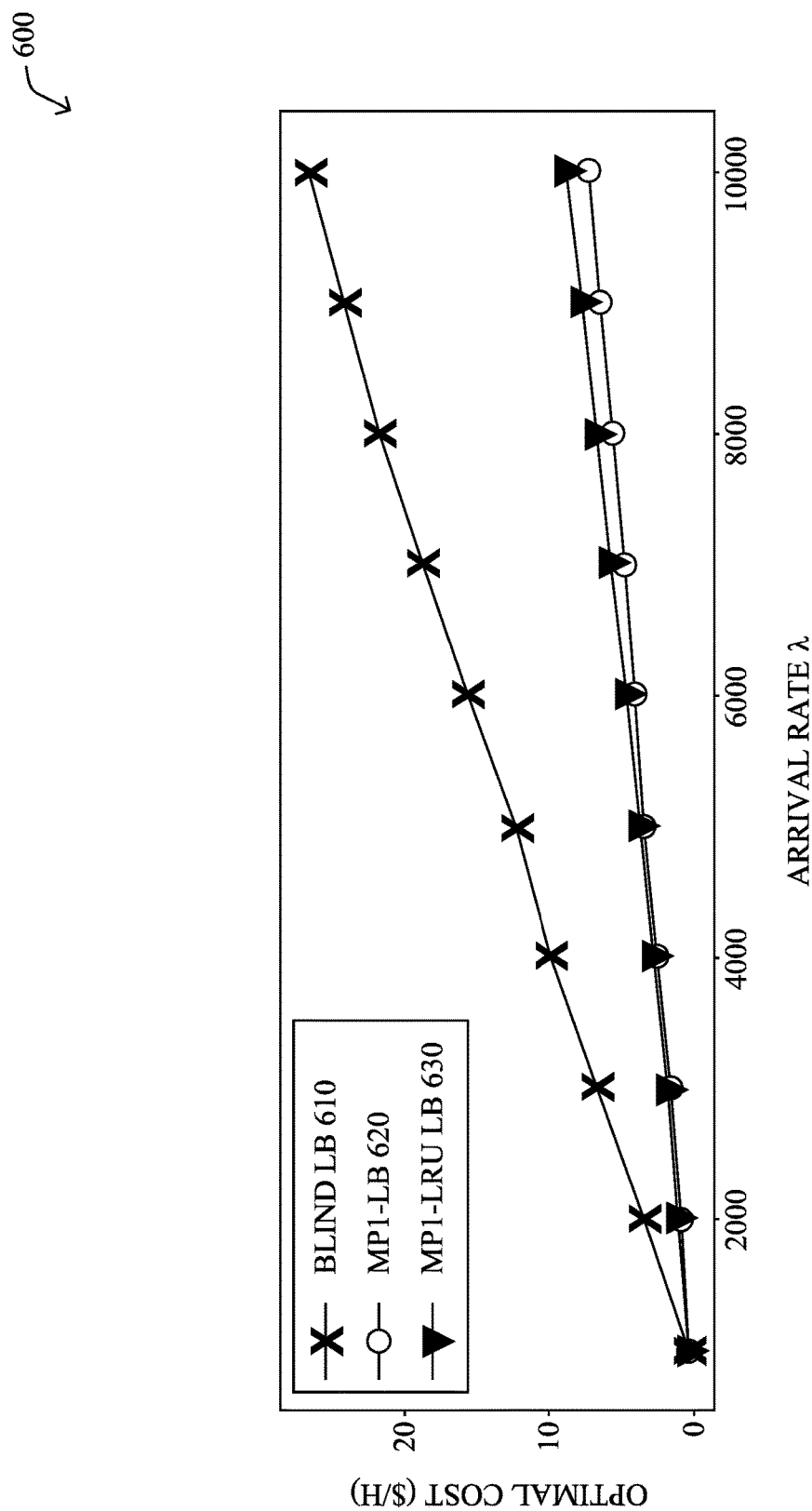
FIG. 6 illustrates another example benefit of popularity-based load-balancing for Fog-Cloud placement.

To demonstrate the cost consideration benefits of the techniques herein, FIG. 6 illustrates an example comparison chart 600 between optimal cost (y-axis) and arrival rate (x-axis). For example, consider the following use case:

A fog node with a 3 GHz CPU processor and 1 GB of available storage for cache, accessible with a 4 ms round-trip-time (RTT) for a user.

A content catalogue of size $10^7$ with a popularity distribution Zipf of parameter 1.01.

The cloud platform is the Google Compute Platform (https://cloud.google.com/compute/), accessible with a 40 ms RTT.

The size of processed data requested by users and actuators is 10 KB.

We require that the average response time for a request plus its standard deviation to be under 100 ms.

Depending on the average arrival rate of requests (x-axis, in Hz), example results have the illustrated costs (in y-axis) for the Blind-LB (610), MP1-LB (620), and MP1-LRU LB (630) strategies. As can be seen, the MP1-LRU strategy is close to the optimal MP1-strategy, without the need to compute the distribution popularity, thus saving memory and compute time. Also, the cost difference between MP1-LRU and the Blind LB grows linearly with a factor 3.8\$ per Hz and hour as the arrival rate grows, making the strategies herein much more efficient at handling sudden bursts of requests (e.g., flash crowds).

Figure 7:
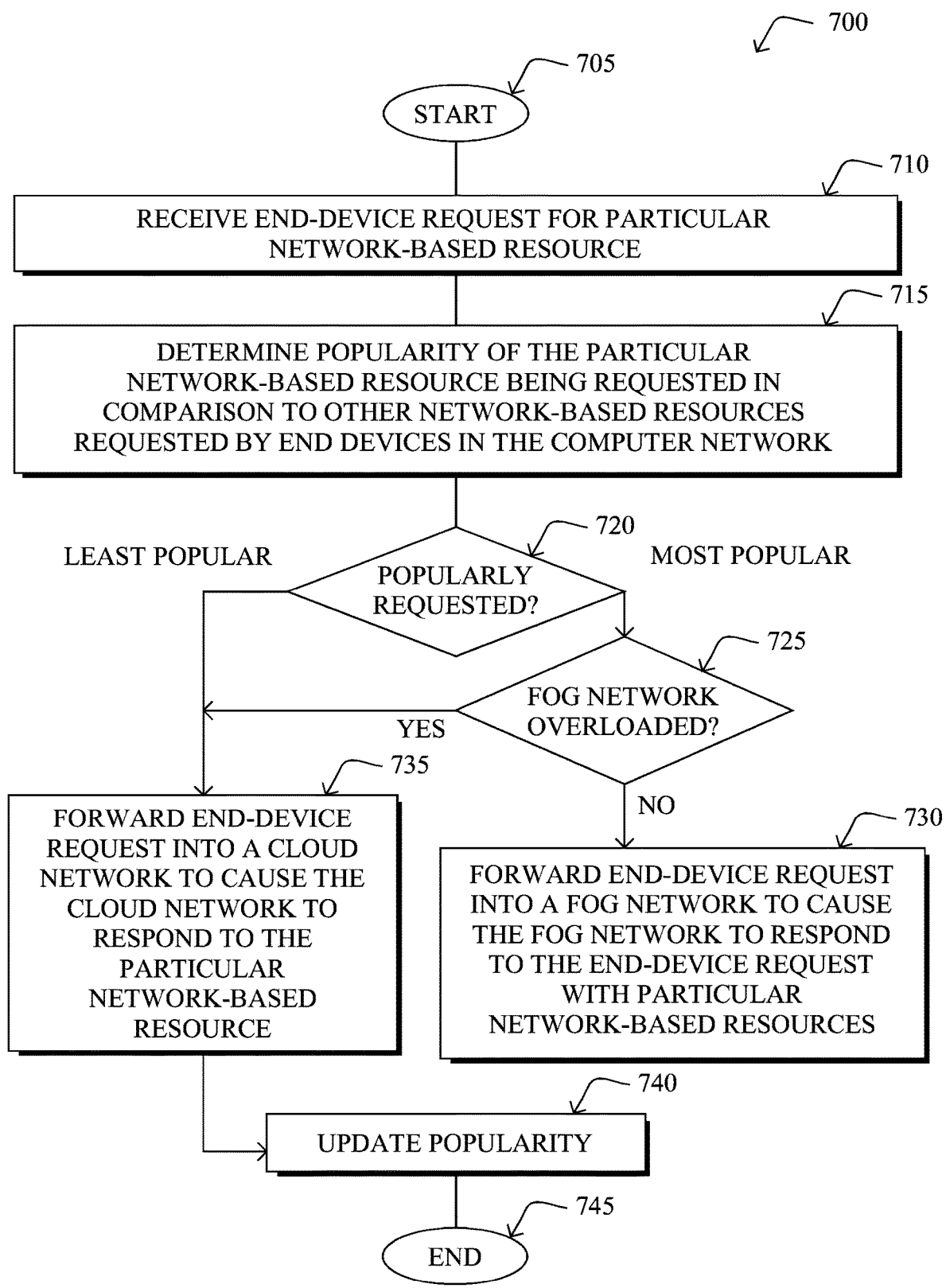
FIG. 7 illustrates an example simplified procedure for popularity-based load-balancing for Fog-Cloud placement.

FIG. 7 illustrates an example simplified procedure for popularity-based load-balancing for Fog-Cloud placement in a network in accordance with one or more embodiments described herein. For example, a non-generic, specifically configured device (e.g., device 200, such as a load-balancer 330) may perform procedure 700 by executing stored instructions (e.g., process 248). The procedure 700 may start at step 705, and continues to step 710, where, as described in greater detail above, a load-balancer 330 (e.g., an API gateway or else based on ICN) receives an end-device request 370 for a particular network-based resource (e.g., sensor data, computation processes, etc.). (Note that in the ICN embodiment, the load-balancer may determine content of the end-device request based on an ICN name in an interest packet, as mentioned above.)

In step 715, the load-balancer may then determine a popularity of the particular network-based resource being requested in comparison to other network-based resources requested by end devices 310 in the computer network. For instance, as described above, this may be based in one embodiment on computing an actual "count-based popularity" of network-based resources requested by end devices in the computer network, such that "popularly requested" network-based resources are those above a defined threshold of popularity (e.g., "most popular" requests). Alternatively, in another embodiment as described above, popularity may be based on maintaining an LRU filter of network-based resources requested by end devices in the computer network, such that "popularly requested" network-based resources are those remaining within the LRU filter. In this embodiment, notably, the LRU filter may have a fixed size, which may be based on one of either a root finding algorithm or a congestion control algorithm, as mentioned above, or else may simply be set to some approximation, such as twice the size of a configured cache within the Fog network (cache 342).

In step 720, the load-balancer determines whether the particular network-based resource is being popularly requested (e.g., count-based thresholds/ranking or else remaining within an LRU filter). In response to the particular network-based resource being popularly requested, in step 725 the load-balancer may optionally determine first whether the Fog network is overloaded with requests, such as based on some feedback mechanism or else based on responses 375 from the Fog network surpassing a defined latency limit (e.g., determined according to interest timestamps within a PIT). In one specific embodiment as mentioned above, the defined latency limit may be based on an average latency of responses from the Fog network plus a standard deviation of the latency of responses from the Fog network.

If the particular network-based resource is being popularly requested in step 720, and the Fog network is not overloaded with requests in step 725, then in step 730 the load-balancer may forward the end-device request into a Fog network 340 to cause the Fog network to respond to the end-device request with the particular network-based resource. According to the techniques herein, in particular, by sending only the most popular requests to the Fog, the Fog is more likely to have cached the most-requested resources, resulting in more cache hits, and faster overall request processing.

On the other hand, in response to the particular network-based resource not being popularly requested in step 720, or else in response to the Fog network being overloaded with requests in step 725, then in step 735 the load-balancer forwards the end-device request into a Cloud network 360 to cause the Cloud network to respond to the end-device request with the particular network-based resource. In this manner, the Cloud is used only for infrequent requests, saving Fog cache space, or else in response to the Fog's inability to process all of the requests, such as where flash crowds or other bursts of requests occur.

In step 740 the load-balancer may update the popularity of the requests based on the received request (e.g., adding to the count or adjusting the LRU filter), and the procedure may then end in step 745. Notably, as further requests are received in step 710, the popularity may change over time, and the requests may be forwarded to either the Fog or Cloud, accordingly.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for popularity-based load-balancing for Fog-Cloud placement in a computer network. In particular, the techniques herein, efficiently distribute requests between the Fog and the Cloud in a manner that minimizes latency and cost by optimizing cache hits in the Fog, thus greatly increasing the number of requests that can be handled in the Fog, without overburdening the Fog resources. Specifically, Fog resources are utilized more efficiently, where according to the techniques herein, under stable request arrival rate and at a fixed cloud budget, each application requires fewer resources than conventional "blind" load-balancing thanks to the optimized cache hit rate. Additionally, the techniques herein take into account network conditions and computing load in the Fog, while still being capable of quickly reacting to abrupt changes in popularity/network conditions. That is, the techniques herein lower the cost of offloading requests to the Cloud in case of sudden bursts of requests under latency constraints. Furthermore, the techniques herein differ from random path choosing strategies since the techniques herein are deterministically choosing the Fog as the fast-path, thus increasing the efficiency of the load-balancing algorithm herein.

While there have been shown and described illustrative embodiments that provide for popularity-based load-balancing for Fog-Cloud placement, it is to be understood that various other adaptations and modifications may be made within the spirit and scope of the embodiments herein. For example, while certain embodiments are described herein with respect to using certain network configurations and/or protocols, the techniques herein are not limited as such and may be used within other embodiments, in other embodiments.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
receiving, by a load-balancer in a computer network, an end-device request for a particular network-based resource;
determining, by the load-balancer, a popularity of the particular network-based resource being requested in comparison to other network-based resources requested by end devices in the computer network;
in response to the particular network-based resource being popularly requested, forwarding the end-device request, by the load-balancer, into a Fog network to cause the Fog network to respond to the end-device request with the particular network-based resource; and
in response to the particular network-based resource not being popularly requested, forwarding the end-device request, by the load-balancer, into a Cloud network to cause the Cloud network to respond to the end-device request with the particular network-based resource.

2. The method as in claim 1, further comprising:
in response to the particular network-based resource being popularly requested, determining whether the Fog network is overloaded with requests; and
forwarding the end-device request into the Cloud network instead of the Fog network in response to the Fog network being overloaded with requests.

3. The method as in claim 2, further comprising:
determining that the Fog network is being overloaded with requests based on responses from the Fog network surpassing a defined latency limit.

4. The method as in claim 3, wherein the defined latency limit is based on an average latency of responses from the Fog network plus a standard deviation of the latency of responses from the Fog network.

5. The method as in claim 3, further comprising:
determining the latency of responses from the Fog network based on interest timestamps within a pending interest table (PIT).

6. The method as in claim 1, wherein determining the popularity comprises:
   computing count-based popularity of network-based resources requested by end devices in the computer network, wherein popularly requested network-based resources are those above a defined threshold of popularity.

7. The method as in claim 1, wherein determining the popularity comprises:
   maintaining a least-recently-used (LRU) filter of network-based resources requested by end devices in the computer network, wherein popularly requested network-based resources are those remaining within the LRU filter.

8. The method as in claim 7, wherein the LRU filter has a fixed size.

9. The method as in claim 8, further comprising:
   determining the fixed sized based on one of either a root finding algorithm or a congestion control algorithm.

10. The method as in claim 8, wherein the fixed size is twice the size of a configured cache within the Fog network.

11. The method as in claim 1, wherein the load-balancer comprises an application programming interface (API) gateway.

12. The method as in claim 1, wherein the load-balancer is based on information centric networking (ICN).

13. The method as in claim 12, further comprising:
   determining content of the end-device request based on an ICN name in an interest packet.

14. A tangible, non-transitory, computer-readable medium storing program instructions that cause a computer to execute a process comprising:
   receiving an end-device request for a particular network-based resource;
   determining a popularity of the particular network-based resource being requested in comparison to other network-based resources requested by end devices in a computer network;
   in response to the particular network-based resource being popularly requested, forwarding the end-device request into a Fog network to cause the Fog network to respond to the end-device request with the particular network-based resource; and
   in response to the particular network-based resource not being popularly requested, forwarding the end-device request into a Cloud network to cause the Cloud network to respond to the end-device request with the particular network-based resource.

15. The computer-readable medium as in claim 14, the process further comprising:
   in response to the particular network-based resource being popularly requested, determining whether the Fog network is overloaded with requests; and
   forwarding the end-device request into the Cloud network instead of the Fog network in response to the Fog network being overloaded with requests.

16. The computer-readable medium as in claim 15, the process further comprising:
   determining that the Fog network is being overloaded with requests based on responses from the Fog network surpassing a defined latency limit.

17. The computer-readable medium as in claim 14, the process, when executed to determine the popularity, further comprising:
   computing count-based popularity of network-based resources requested by end devices in the computer network, wherein popularly requested network-based resources are those above a defined threshold of popularity.

18. The computer-readable medium as in claim 14, the process, when executed to determine the popularity, further comprising:
   maintaining a least-recently-used (LRU) filter of network-based resources requested by end devices in the computer network, wherein popularly requested network-based resources are those remaining within the LRU filter.

19. An apparatus, comprising:
   one or more network interfaces to communicate with a computer network;
   a processor coupled to the network interfaces and configured to execute one or more process; and
   a memory configured to store a process executable by the processor, the process when executed, configured to:
      receive an end-device request for a particular network-based resource;
      determine a popularity of the particular network-based resource being requested in comparison to other network-based resources requested by end devices in the computer network;
      in response to the particular network-based resource being popularly requested, forward the end-device request into a Fog network to cause the Fog network to respond to the end-device request with the particular network-based resource; and
      in response to the particular network-based resource not being popularly requested, forward the end-device request into a Cloud network to cause the Cloud network to respond to the end-device request with the particular network-based resource.

20. The apparatus as in claim 19, the process, when executed to determine the popularity, further configured to:
   maintain a least-recently-used (LRU) filter of network-based resources requested by end devices in the computer network, wherein popularly requested network-based resources are those remaining within the LRU filter.

* * * * *